United States Patent [19]

Spencer

[11] 3,737,576

[45] June 5, 1973

[54] ON-PREMISE PAYSTATION ADAPTER

[75] Inventor: Lucian W. Spencer, Dallas, Tex.

[73] Assignee: Superior Continental Corporation, Hickory, N.C.

[22] Filed: Feb. 18, 1970

[21] Appl. No.: 12,236

[52] U.S. Cl. ....179/6.3 R

[51] Int. Cl. ....H04m 17/02

[58] Field of Search ....179/6.3, 84 UF, 90 D, 179/81 R

[56] References Cited

UNITED STATES PATENTS

| | | | |
|---|---|---|---|
| 3,087,017 | 4/1963 | Lomax | 179/6.3 R |
| 3,014,986 | 12/1961 | Lomax | 179/6.3 R |
| 2,908,757 | 10/1959 | Lomax | 179/6.3 R |
| 3,448,218 | 6/1969 | Long | 179/6.3 |
| 2,372,262 | 3/1945 | Edwards et al. | 179/6.3 |
| 2,955,161 | 10/1960 | Faulkner | 179/6.3 |
| 3,229,041 | 1/1966 | Drake et al. | 179/84 UF |
| 2,908,757 | 10/1959 | Lomax | 179/6.3 |

*Primary Examiner*—Kathleen H. Claffy
*Assistant Examiner*—Thomas D'Amico
*Attorney*—Roy B. Moffitt

[57] ABSTRACT

The herein-disclosed On-Premise Paystation Adapter consists of three basic circuits: a three-tone audio frequency receiver; an adapter circuit to sense the telephone line condition; and an appropriate ac power supply to provide certain needed dc voltages. One basic feature of the instant adapter is that it is housed along with the telephone paystation itself, and the basic circuitry for the paystation conversion is at the location of the pay phone; thereby eliminating costly central office control equipment. The adapter portion of the On-Premise Paystation Adapter combines a pay telephone with two means, namely, a means for seizing a talking path from that paystation to a remote central office upon rendering the paystation to an "off-hook" condition; and, a means electrically connected to the last-mentioned means, also responsive to an "off-hook" condition that electrically bridges the seized talking path with a means to prevent dial pulses from being transmitted to the central office over the talking pair until a predetermined number of coins have been deposited.

16 Claims, 6 Drawing Figures

LUCIAN W. SPENCER
*INVENTOR.*

BY [signature]
ATTORNEY

LUCIAN W. SPENCER-INVENTOR

ATTORNEY Roy B. Moore

LUCIAN W. SPENCER-INVENTOR

ATTORNEY Roy B. Moffitt

LUCIAN W. SPENCER-INVENTOR

ATTORNEY

LUCIAN W. SPENCER-INVENTOR
ATTORNEY

LUCIAN W. SPENCER-INVENTOR

ATTORNEY Roy B. Moffitt

ON-PREMISE PAYSTATION ADAPTER

BACKGROUND OF THE INVENTION

The pay telephone has been in use for a great many of years and a variety of types have been placed into service. These types are broken down principally into three classifications: postpay; local prepay; and prepay. The general difference among these three types is the method employed to collect and refund coins. In the postpay type device, once the coin is deposited, it is collected. This type of arrangement is possible because when a calling party goes "off-hook," a talking pair is seized and dial pulses can be transmitted over this talking pair to a central office to ring a called party. However, once the called party answers, conversation between the two parties is terminated because of the transmitter in the calling party's telephone being shunted until a predetermined number of coins has been deposited. In the local prepay type of paystation device, money is deposited and is collected only upon answer by the called party; or, in cases where the call is to an operator, the initial coin is returned and the operator has no further control over refunding or collecting of coins, subsequently deposited. In the prepay telephone, the operator has full control over collecting or refunding of money on toll calls. In addition, coins are returned any time the paystation calling party has reached a "no answer" called party.

By and large, the prepay type of paystation telephone predominates as far as members are concerned. Consequently, in examining the operating instructions for two of these three types of paystations, one finds the source of confusion that exists with the using public, namely, the human failure of the average citizen to read the instructions on postpay and local prepay telephones. This failure usually results in a variety of complaints, which include "lost coins"; "inability to speak to the called party"; and "complaints from called subscribers." Out of these complaints, another problem arises. In many cases, the paystation is physically abused because the calling party thinks that it is not working and vents his frustration out on the apparatus rather than following the directions posted for his benefit. This results in torn receiver cords, broken dials, jammed coin chutes, and paystation panels torn from their moorings.

The On-Premise Paystation Adapter is designed to convert the postpay paystation telephone to a prepay type paystation telephone, thereby eliminating the problems which exist because of the various types of paystations now available to the public. The entire adapter is designed to work with existing switchboards with a minimum modification of facilities. Any line terminal may be assigned to the adapter. Connections to the switchboard are normally made through six leads, namely: tip; ring; sleeve; PS (operator identification lead); dial tone and dial start; battery and ground. The paystation instrument is connected to two leads designated "tip" and "ring." Coin refund voltage is standard plus or minus 110–130 volts dc.

A previous postpay paystation converted to a prepay paystation incorporates the following features: dial tone is rendered to the calling paystation party before a coin is deposited. This is so because the unmodified postpay paystation gives a dial tone to the calling party upon going "off-hook." However, dialing out is not possible because of a dial pulse blocking means being placed across the talking pair once the calling party goes "off-hook."

On calls to an operator, the initial coin is refunded upon answer by the operator as a result of two tones automatically transmitted to the paystation from a central office. On calls to an operator, subsequent coins deposited are held in the payphone until the operator determines if those coins should be collected or refunded. If the operator wishes to collect the coins, she depresses a key, transmitting two tones to the adapter. To refund the coin, the operator transmits two different tones to the adapter. If an operator wishes to ring the paystation for any reason, two tones different from the tones mentioned previously are transmitted. In all cases of "no answer," the coin is refunded. Employment of tone signal allows the adapter to operate with either physical or carrier trunks to the called center.

The adapter itself contains circuitry that has two means. When the adapter is electrically in combination with an otherwise postpay paystation telephone, one of these means is adapted for seizing a talking path from that paystation to a remote central office upon the paystation going to the "off-hook" condition and the second means electrically bridges the talking path thus seized with a dial pulse blocking means. This blocking means prevents dial pulses from being transmitted to the central office over the talking pair until the proper amount of coins have been deposited. It is this last-mentioned act that activates means to remove the dial pulse blocking means from its bridging position. The coins so deposited are collected permanently only when the adapter has detected a reverse battery condition, i.e., a called party has answered and the pay station is placed on hook. Thus, the adapter converts an otherwise postpay pay telephone station so that its operation is the same as the usual prepay paystation telephone.

Through the use of the On-Premise Paystation Adapter, the basic circuitry for the paystation operation is on the paystation premise, i.e., at the location of the payphone; thus, costly control central office equipment is eliminated.

The above features are objects of this invention and further objects will appear in the detailed description which follows and will be otherwise apparent to those skilled in the art.

For the purpose of illustration of this invention, there is shown in the accompanying drawings, circuits employed with the On-Premise Paystation Adapter of this invention. It is to be understood, however, that these drawings are for the purpose of example only and the invention is not limited thereto.

IN THE DRAWINGS

DETAILED DESCRIPTION OF THE INVENTION

The On-Premise Paystation Adapter is comprised of three basic circuits: a three-tone audio frequency receiver; an adapter circuit to sense the telephone line condition; and a 110 volt ac power supply to provide the dc voltage of plus 6, plus 12, and plus 50. These three circuits in combination are housed along with the paystation in the "panel-phone" type housing at the paystation itself. Through the use of the On-Premise Paystation Adapter, the basic circuitry for the paystation operation is at the location of the payphone; thus, costly control central office equipment is eliminated.

THREE TONE AUDIO FREQUENCY RECEIVER

Figure 2:
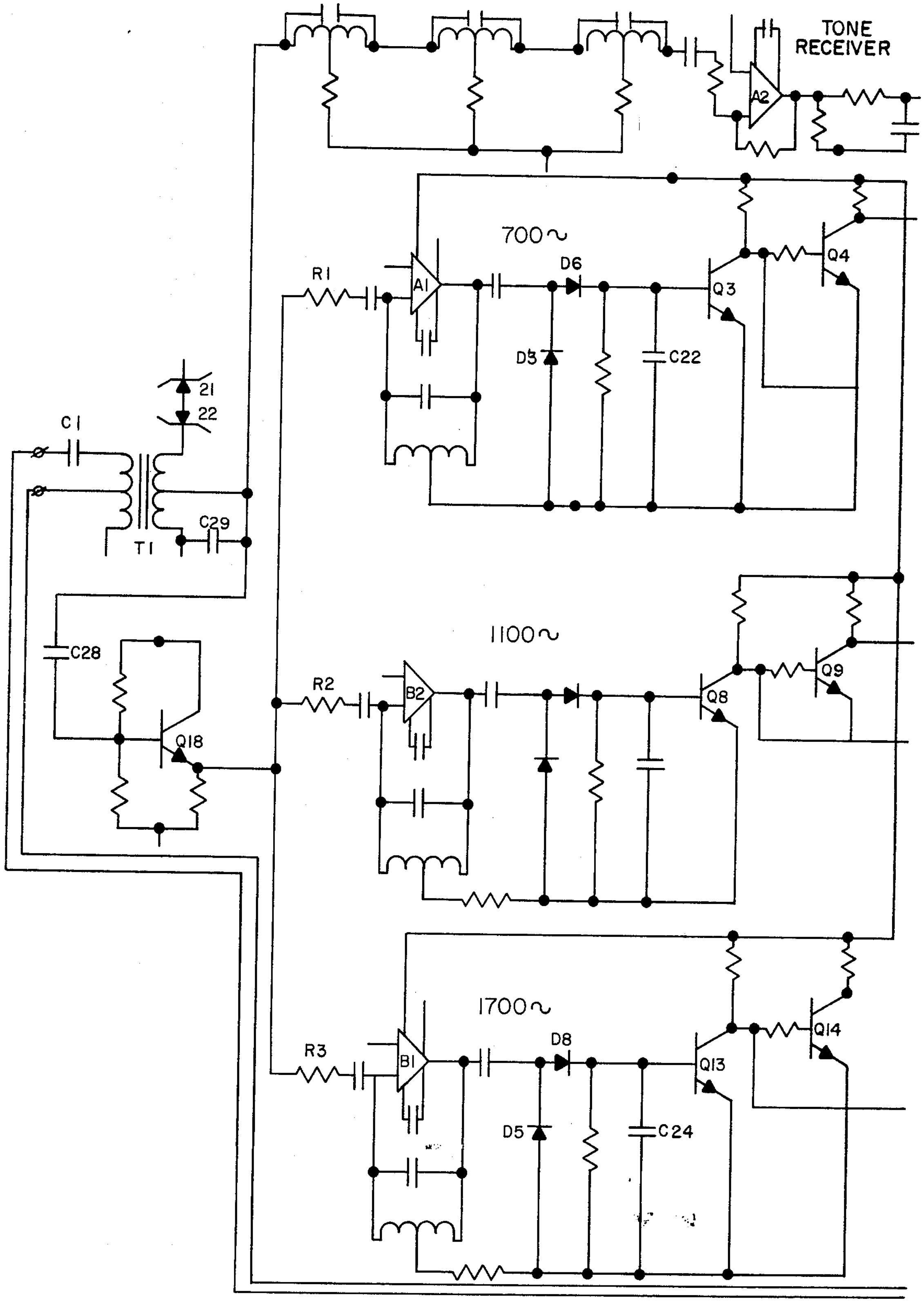
FIG. 2 is a schematic diagram of a portion of the tone receiver of the On-Premise Paystation Adapter.
Figure 3:
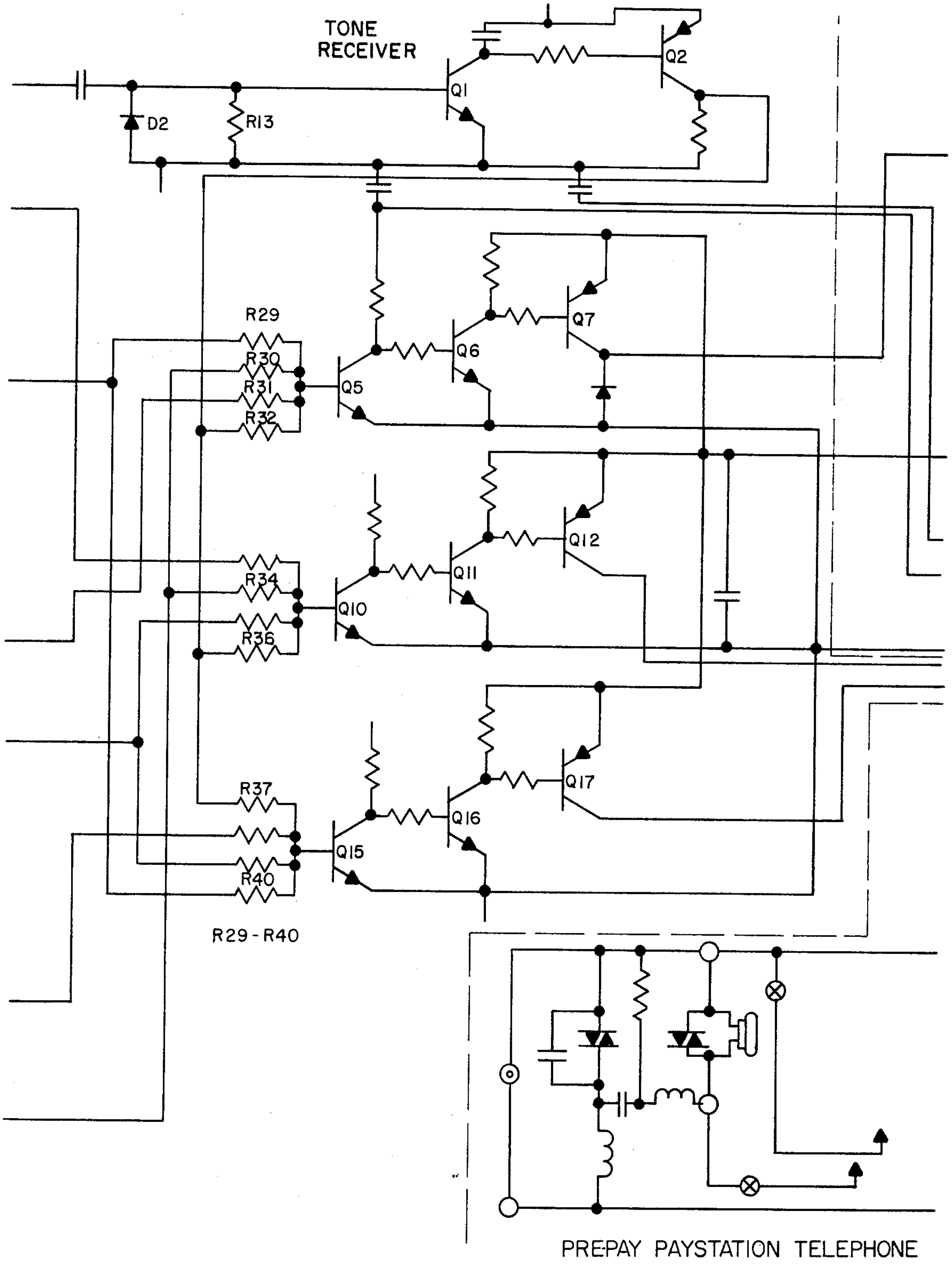
FIG. 3 is a schematic diagram of the other portion of the tone receiver shown partially in FIG. 2.

The three-tone audio frequency receiver, as shown in FIGS. 2 and 3, is per se well known and conventional. Therefore, only a brief description of this particular circuit and its components will be set forth. Such should be sufficient to enable one of only ordinary skill in the art to understand the operation of this three-tone receiver. In the main, the three-tone receiver consists of the following basic circuits:

Pre-amplifier Q18;

Band-pass amplifier for 700 Hz (Al, Q3 and Q4);

Band-pass filter for 1,100 Hz (B2, Q8 and Q9);

Band-pass amplifier for 1,700 Hz (B1, Q13 and Q14);

Band-stop amplifier for 700 Hz, 1,100 Hz and 1,700 Hz (A2, Q1 and Q2);

Logic and driver circuit for 700 Hz and 1,700 Hz (Q5, Q6 and Q7);

Logic and driver circuit for 1,100 Hz and 1,700 Hz (Q10, Q11 and Q12); and, Logic and driver circuit for 700 Hz and 1,100 Hz (Q15, Q16 and Q17).

The three-tone receiver is a device designed to perform functions upon the receipt of each of two tone combinations of three tones. The combinations are: 700 Hz and 1,700 Hz; 700 Hz and 1,100 Hz; and, 1,100 Hz and 1,700 Hz. In order to prevent false triggering, due to other than precise tones, the inhibit channel (stop-band filter A2) is designed to pass frequencies in the voice band other than the tones selected. The output of the amplifiers (A1, B2 and B1) is connected to the appropriate logic circuits in such a manner so that if any frequencies are present, other than the desired tones, the logic circuits are prevented from operating. In order to operate the logic circuits, two pure tones of the proper frequencies are required and no other frequency or frequencies. The band-pass amplifiers, as identified above, utilize active filters consisting of an integrated circuit amplifier and an LC circuit tuned to the desired frequency. Such filters are well known and conventional and will not be discussed for this reason.

Incoming tones are applied across T and R ("tip" and "ring") to the primary of T1. Capacitor C1 is provided for dc blocking. The secondary of T1 is shunted by two zeners back to back (Z1 and Z2), which limit the voltage that can be developed to about 3 volts peak to peak regardless of input. Capacitor C29 is to provide a low impedance path for transients and other high frequency pulses, which are of too short duration to be shunted by the zeners (Z1 and Z2) thus providing protection for transistor Q18. The secondary of T1 is connected to the input of the stop-band amplifier and also through capacitor C28 to transistor Q18.

Transistor Q18 is an emitter-follower amplifier provided to isolate the band-pass amplifiers from the stop-band amplifier. Voltage gain here is near unity. Resistors R1, R2 and R3 are provided for isolation between band-pass amplifiers and their values, as is well known, are selected to equalize the gain through the amplifiers. Each amplifier is identical except for the frequency-determining sections.

When there is no incoming signal, the following conditions exist:

Amplifiers A1, A2, B1 and B2 are operating;

Amplifier Q18 is also operating; and,

Transistors Q1, Q2, Q3, Q6, Q7, Q8, Q11, Q12, Q13, Q16 and Q17 are not conducting; however, Transistors Q4, Q5, Q9, Q10, Q14 and Q15 are conducting.

Assuming that 700 Hz and 1,700 Hz tones and no other frequencies are received, the following events occur:

a. Amplifier A1 with its associated frequency selective feed-back network amplifies the 700 Hz, which is rectified by diodes D3 and D6, filtered by capacitor C22 and applied to transistor Q3 causing Transistor Q3 to conduct and transistor Q4 to turn off. The collector of transistor Q3 applies a minus 43 volts to resistors R29 and R40;

b. Amplifier B1, with its associated frequency selective feed-back network amplifies the 1,700 Hz, which is rectified by diodes D5 and D8, filtered by capacitor C24 and applied to transistor Q13 causing transistor Q13 to conduct and transistor Q14 to turn off. The collector of transistor Q13 applies a minus 43 volts to resistors R30 and R34;

c. No signal is amplified by amplifier A2 because of the stop-band filters; therefore, transistors Q1 and Q2 remain in the "off" condition. The emitter of transistor Q2 applies a minus 43 volts to resistors R32, R36 and R37;

d. No signal is amplified by B2 because the 1,100 Hz is not present, therefore, transistor Q8 remains non-conducting and transistor Q9 remains conducting. The collector of transistor Q9 applies a minus 43 volts to resistor R31; and, e. Resistors R29, R30, R31 and R32 all have a minus 43 volts applied. Therefore, transistor Q5 is turned off and transistor Q6 is turned on, which in turn also causes transistor Q7 to conduct, thereby producing an output.

In the event that a frequency of frequencies, other than 700 Hz, 1,100 Hz, or 1,700 Hz is received, the stop-band filter A2 will amplify and this signal will be rectified by diode D2 causing transistor Q1 and Q2 to conduct. The collectr of transistor Q2 applies a plus 12 volts to resistors R32, R36 and R37, thereby causing a condition that will keep transistors Q5, Q10 and Q15 conducting regardless of a potential applied to the other logic elements. This prevents an output from any of the three driver circuits containing transistors Q7, Q12, and Q17.

Tone receiver sensitivity is, at least, minus 18 dBm per frequency for the band-pass amplifiers. Sensitivity of the stop-band amplifier depends upon frequency and may be determined approximately by means of use of typical response curves well known to those skilled in the art.

ON-PREMISE PAYSTATION ADAPTER

Figure 1:
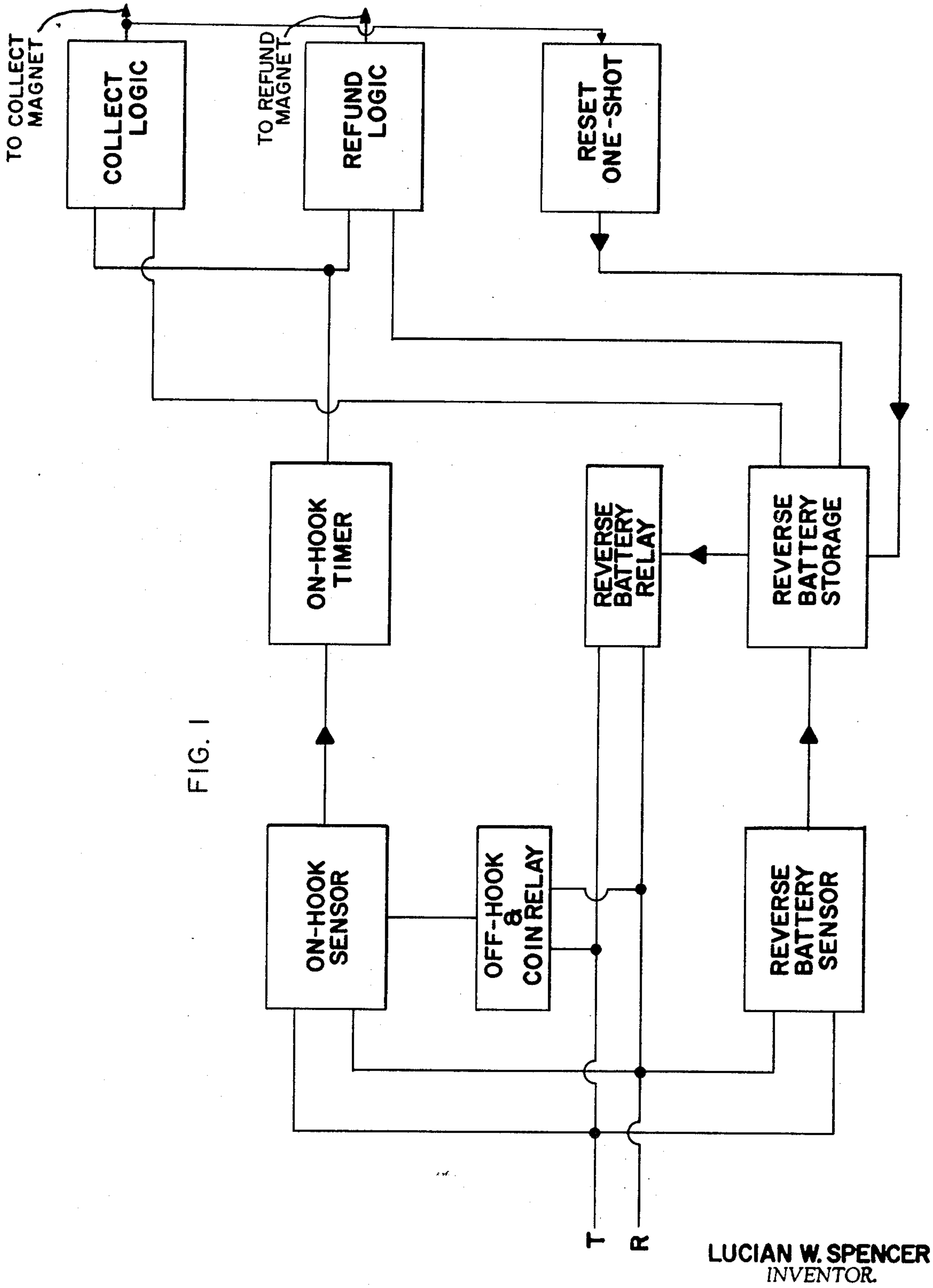
FIG. 1 is a block diagram of the adapter portion of the On-Premise Paystation Adapter circuit.

Directing attention to FIG. 1, it will be noted that the adapter portion of the prepay station adapter circuit is made up primarily of four parts. One such part is the "reverse battery sensor," which is electrically connected to the reverse battery storage means. This last-mentioned means is essentially a flip-flop, which is a storage means. Such a storage means could be a condenser, two transistors, one conducting while the other is not conducting and vice versa, a silicon rectifier, a relay or a core memory. With the reverse battery sensor and the reverse battery storage (flip-flop) making up the first two parts of the adapter circuit, it will be appreciated that the third part is made up of the "on-hook" sensor, which is responsive, or rather senses, that the paystation has gone to an "on-hook" condition. This sensor activates the collect logic circuit, which in turn allows the final collection of previously-deposited coins.

Figure 5:
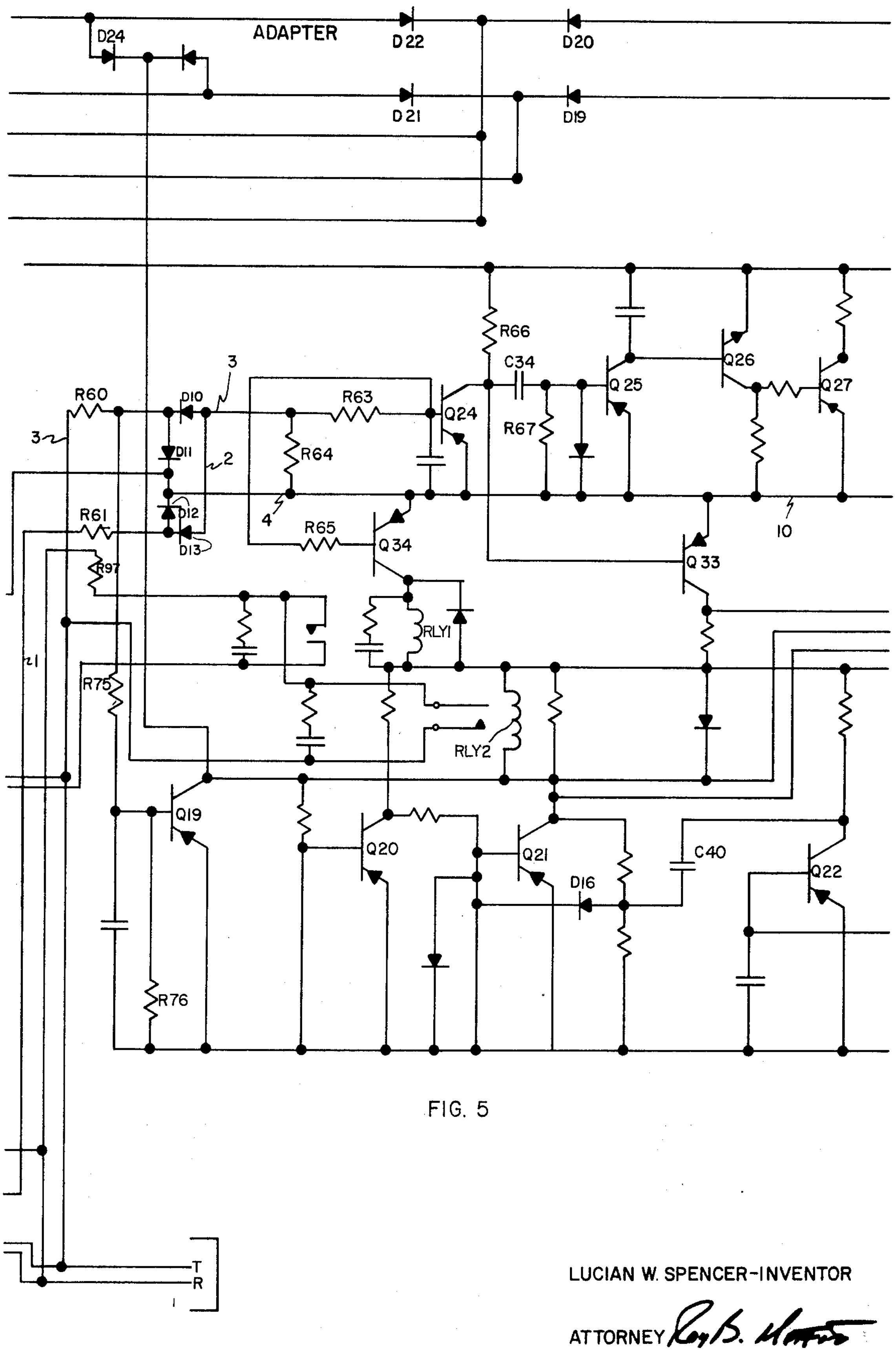
FIGS. 5 and 6 show the adapter portion of the On-Premise Paystation Adapter that allows a postpay paystation telephone to be converted to a prepay paystation telephone.

The "reverse battery relay" corresponds to relay RLY-2 and the "off-hook" and coin relay corresponds to relay RLY-1, both of which are shown in FIG. 5.

When a calling party makes a call and the called party answers, reverse talking battery is created. Therefore, the reverse battery sensor senses this condition and stores this information in the reverse battery storage (hereinafter referred to as a "flip-flop"). This flip-flop has a normal state of refund and is rendered to a "collect" state by the presence of reverse battery polarity. When the flip-flop is in a collect state and the "on-hook" sensor has sensed that the calling (paystation) party has gone "on-hook," then the storage means (flip-flop) is able, through the thus-completed circuit, to activate the collect logic and therefore collect money previously deposited.

It will also be appreciated from the block diagram of FIG. 1, that when the reverse battery storage, or flip-flop, is in its normal state, i.e., its "refund"state, there is connected to this means through the reverse battery sensing, or detecting means, and the paystation "on-hook" sensor, a circuit that will allow activation of the refund logic when the flip-flop is in the refund position and the calling party goes "on-hook."

Between the coin collector logic and reverse battery storage means, there is connected a one-shot reset means, which is responsive only upon activation of the coin collect means and is adapted to return the reverse battery storage means to its normal "refund" state upon its activation.

Relay RLY-1 (off-hook and coin relay) upon activation places a resistor (R97) across T and R which in turn prevents dial pulses from being sent down the talking pair (T and R). It will be noted that this relay is connected to both the tip and ring (T and R) talking pair, one side of this connection completing a circuit through the reverse battery storage and is responsive to calls in such a manner that a dial pulse blocking means (a resistor) achieves a dial pulse blocking placement only when the storage means is in its "collect" state and not its "refund" state.

When a calling party hangs up, deposited money is collected. This collection activates the one-shot reset means, which then causes the dial pulse blocking means to be removed from across T and R. Such action brings the paystation back to its normal state whereupon a calling party initiating another call would place the dial pulse blocking means across T and R upon rendering the paystation to an "off-hook" state. A more detailed description of how the circuitry operates follows using FIGS. 2 through 6 to achieve this description.

Figure 6:
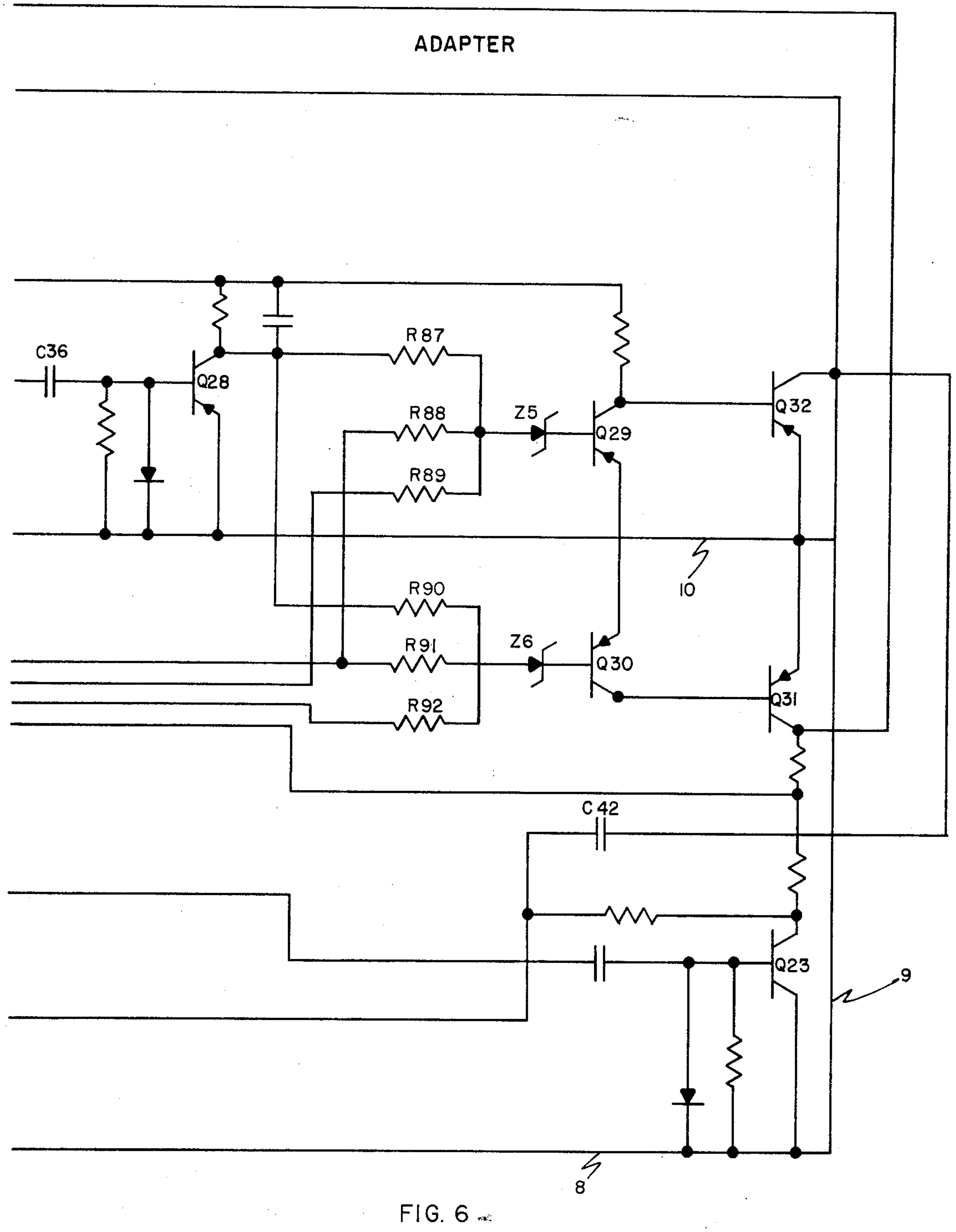

The On-Premise Paystation Adapter has an adapter circuit as shown in FIGS. 5 and 6. This adapter circuit consists of the following basic circuits:

An Off-hook sensor D10, D11, D12, D13, Q24, and Q34;

A reverse battery sensor Q19;

A reverse battery information storage flip-flop Q20 and Q21;

An "operate" circuit Q25, Q26, Q27, Q28 and Q33;

A"reset" circuit Q22 and Q23;

Two "driver" circuits Q29-Q32 and Q30-Q31; and,

Two logic circuits R87, R88, R89, Z5 and R90, R91, R92, and Z6.

Figure 4:
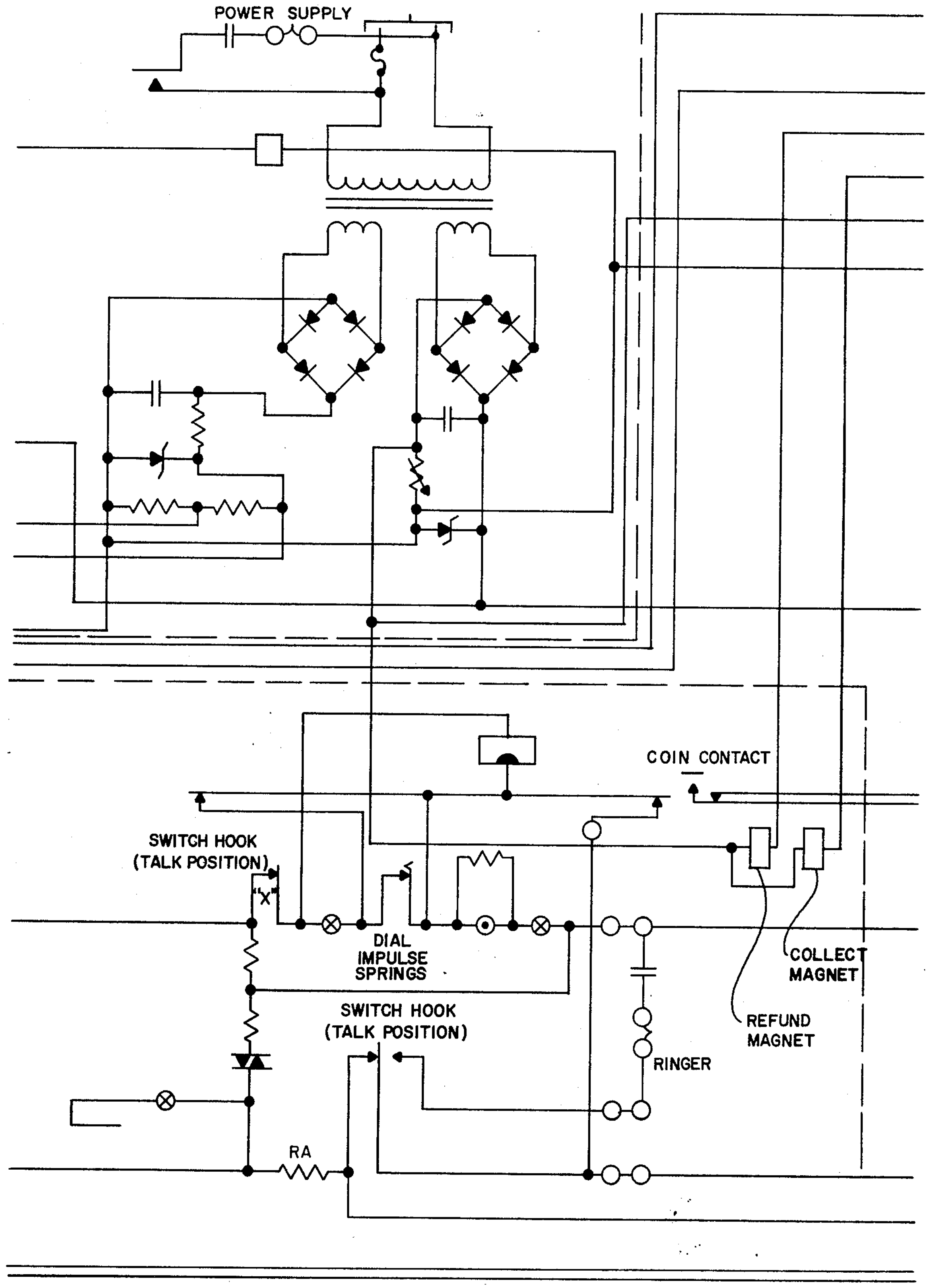
FIG. 4 shows a power supply for the On-Premise Paystation Adapter.

When the paystation telephone is in the "on-hook" condition, the tone receiver is connected across the telephone line (T and R), and the adapter circuit is disconnected by means of the paystation switchhook, which disconnects R from RA. When the paystation is taken "off-hook," R is connected to RA and current flows down from lead 1 through resistor R61, diode D13, up through lead 2 on to lead 3 and down through resistor R64, on to lead 4 and then up through diode D11 on to leads 3 and through resistor R60 back to T. Voltage developed across resistor R64 is applied through resistor R63 to the base of transistor Q24, causing Q24 to conduct. This voltage is also applied through resistor R65 to the base of transistor Q34, causing transistor Q34 to conduct, thereby operating relay 1, which through its contacts and the closed coin contacts (see FIG. 4) of the paystation, places resistor R97 across T and R (tip and ring) thereby preventing dialing by means of a dial or pulsing the switchhook (FIG. 4).

When the proper amount of money is deposited in the paystation, the coin contact (FIG. 4) opens, thereby removing resistor R97 from across T and R. This permits dialing to take place and a call can be made by the calling party. At this point, T is positive in potential in respect to R and this is what is known as "normal battery" as the called party has yet to answer. Transistor Q19, under these conditions, connected to T through resistor 75 is not conducting.

When the called party answers, the potential on T and R reverses due to action in the telephone central office (not shown in the drawings) and as a result, T becomes negative in respect to RA. This is known as "reverse battery." Current flows from T on to lead line 3 through resistor R60 and through lead line 5 to resistor R75 on to lead 6 and then to lead 7 through resistor R76 on to lead 8 up through lead 9 and on to lead 10 (see FIG. 6 for leads 9 and 10) through diode D12 on to lead 1 and thence through resistor R61 back to RA. The voltage developed across resistor 76 causes transistor Q19 to conduct, which turns off transistor Q20 due to the negative potential being removed from the base of that transistor. Transistor Q20 being turned off, results in its collector becoming negative and through resistor R76 causes transistor Q21 to conduct. A delay of about one second in the action described is produced by capacitor C36 and resistor R75 combination. This delay prevents false operation due to transients and momentary reversals that may occur during switching operations in certain types of central offices. Transistors Q20 and Q21 remain in this condition until reset as will be described hereinafter.

After completion of the call, that is to say the conversation part, and the instant before the paystation is placed "on-hook," the following conditions exist:

Transistor Q21 is conducting, placing a positive potential on resistor R89;

Transistor Q33 is not conducting, placing a negative potential on resistors R88 and R91;

Transistor Q28 is not conducting, placing a negative potential on resistors R87 and R90;

Transistor Q29 is conducting due to a negative potential being applied to its base;

Transistor Q32 is not conducting due to the collector of Transistor Q29 being positive in its potential;

Transistor Q30 is conducting; and,

Transistor Q31 is not conducting.

After the paystation is placed "on-hook," the following events occur. Transistor Q24 stops conducting causing transistor Q33 to conduct and places a positive potential on resistors R88 and R91. Also, as transistor Q24 cuts off, capacitor C34 starts charging from the negative bus through resistor R66, capacitor C34, and resistor R67. This turns on transistor Q25, which starts a timing circuit composed of transistors Q25, Q26, Q27 and Q28, resulting in transistor Q28 conducting for about 0.8 seconds beginning about 2.1 seconds after the paystation is placed "on-hook." The paystation must remain "on-hook" for the full 2.1 seconds. Transistor Q34 turns off at the same time as transistor Q24. While transistor Q25 is conducting, resistors R87, R88 and R89 all have a positive potential resulting in transistor Q29 being turned off. This condition causes transistor Q32 to conduct and operate the collect magnet (FIG. 4) in the paystation through diode D19. At the end of the 0.8 second pulse, transistor Q32 ceases conducting and the negative going pulse, at its collector through capacitor C42, causes one-shot circuit (transistors Q22–Q23) to produce a positive pulse, which through capacitor C40 and diode D16 combination causes transistor Q21 to turn off and transistor Q20 to conduct. This reset function restores flip-flop (transistors Q20-Q21) to its "refund" position to await the next call.

While transistor Q21 is conducting and transistor Q20 is not conducting, which is the "reverse battery" condition, relay 2 (FIG. 5) is operated, which places resistor R97 across T and R. This, in turn, prevents further dialing until the reset pulse from transistors Q22–Q23 turns off transistor Q21, indicating that the call is completed and the money collected.

The foregoing illustrates how the adapter portion of the On-Premise Paystation Adapter operates when a called party answers. The following indicates how the apparatus and circuitry operates when a called party does not answer.

When the paystation is taken "off-hook," or is connected to RA, and current flows from RA through R61, D13, R64, D11 and R60 back to T as previously described, voltage developed across resistor R64 is applied through resistor R63 to the base of transistor Q24 and the emitter of transistor Q24 causing Q24 to conduct. This voltage is also applied through resistor R65 between the base of transistor Q34 and emitter of transistor Q34, causing transistor Q34 to conduct, thereby operating relay 1, which, through its contacts, places resistor R97 across T and R, thereby preventing dialing by means of the dial or pulse in the switchhook.

When the proper amount of money is deposited in the paystation, the money deposited causes the contacts (FIG. 4) of the coin collector to open, thereby removing resistor R97 from across T and R. Such action permits dialing to take place and the call is made. At this point, T is positive in respect to R, and transistor Q19 connected to T through resistor R75 is not conducting.

If the called party does not answer, or the call is abandoned, the instant before the paystation is placed "on-hook," the following conditions exist:

Transistor Q20 is conducting, placing a positive potential on resistor R92;

Transistor Q33 is not conducting, placing the negative potential on resistors R88 and R91;

Transistor Q28 is not conducting, placing a negative potential on resistors R87 and R90;

Transistor Q29 and transistor Q30 are conducting due to a negative potential being on their bases; and, Transistors Q31 and Q32 are not conducting.

After the paystation is placed "on-hook," the following events occur. Transistor Q24 stops conducting, causing transistor Q33 to conduct and consequently places a positive potential on resistors R88 and R91. Also, as transistor Q24 cuts off, capacitor C34 starts charging from the negative bus through resistors R66 and R67. This turns on transistor Q25, which starts a timing circuit composed of transistors Q25, Q26, Q27, Q28, resulting in Q28 conducting for about 0.8 seconds, beginning about 2.1 seconds after the paystation is placed "on-hook." The paystation must remain "on-hook" for this full 2.1 seconds. Transistor Q34 turns off at the same time as transistor Q24. While transistor Q28 is conducting, resistors R90, R91 and R92 will have a positive potential resulting in transistor Q30 being turned off, causing transistor Q31 to conduct and operate the refund magnet (FIG. 4) in the paystation through diode D20. At the end of the 0.8 second pulses, the paystation is ready for another call.

The following description will discuss how the On-Premise Paystation Adapter operates upon a call to the operator. When the paystation is taken "off-hook," R is connected to RA and current flows from RA through R61, D13, R64, D11 and R60 back to T as previously described. Voltage developed across resistor R64 is applied through resistor R63 to the base of transistor Q24 and to the emitter of transistor Q24 causing transistor Q24 to conduct. This voltage is also applied through resistor R65 between the base of transistor Q34 and emitter of transistor Q34 causing Q34 to conduct, thereby operating relay 1, which through its contacts and the closed coin contacts of the paystation places resistor R97 across T and R (tip and ring) thereby preventing dialing by means of the dial or by pulsing the switchhook.

When the proper amount of money is deposited in the paystation, the money deposited causes the contacts of the coin relay to open, thereby removing resistor R97 from across tip and ring (T and R), consequently permitting dialing to take place and the operator is dialed. At this stage, T is positive in potential in respect to R. Transistor Q19 connected to T through R75 is not conducting.

When the operator answers, two tones (1,100 Hz and 1,700 Hz) are automatically transmitted to the paystation from the trunk in the central office. These tones are received by the three-tone receiver and cause a positive potential to appear on the refund output of the receiver, which through diode D22 causes the refund magnet to operate in the paystation, thereby refunding the money thus deposited. The positive potential, also applied through diode D24, causes transistor Q20 to cease conducting and transistor Q21 to conduct, thus setting up the condition to automatically operate the collect magnet in the paystation when the paystation is placed "on-hook," regardless of events in the meantime.

The paystation adapter circuit is now energized in a manner that the operator has complete control of the paystation. The operator may collect money by transmitting two tones, (700 Hz and 1,100 Hz); refund by transmitting tones 1,100 Hz and 1,700 Hz; or ring the paystation bell by transmitting 700 Hz and 1,700 Hz tones. These tones are transmitted when the operator operates keys labeled "collect," "refund," and "ring." Upon completion of the call to the operator, the operation is the same as when a called party has answered a calling party, i.e., reverse battery is detected and stored, etc.

As shown in the drawings (FIG. 4) there are two power supplies, a 12 and 50 volt supply. Both of these power supplies are made up of a transformer secondary wiring that feed a bridge rectifier and a zener diode. Such apparatus is commonplace and well known in the art and forms no part of the instant invention. Consequently, it is felt that further description of such power supplies is unnecessary.

The tone receiver requires 6, 12, and 43 volts for operation. On the other hand, the adapter section requires a 50 volt supply. From a study of the drawings, it would be quite obvious to one of only ordinary skill in the art, to determine how the power supplies are connected to the tone receiver and adapter. Both power supplies are strictly voltage and current sources and other than this, there is no interaction between the power supplies and the adapter unit.

When an incoming call is answered, the paystation telephone set is placed in the "off-hook" state, resistor R97 is bridged across the talking pair (T and R). How this is brought about has been previously described. Although this bridging does not permit dialing pulses to be transmitted over the talking pair by the paystation, only a slight transmission loss results, this loss being in the neighborhood of less than one dB. Thus, conversation over the bridged talking pair is essentially unaffected.

I claim:

1. A telephone paystation adapter for modifying a postpay type paystation telephone apparatus to require prepayment before dialing pulses can be transmitted to a central office, wherein said paystation telephone apparatus has a hook switch, dial impulse spring means connected to said hook switch, and a talking pair of signal transmitting conductors that are adapted to be connected to a central office, said adapter comprising dialing pulse blocking means, means rendered effective by the transfer of said paystation telephone apparatus from its on-hook condition to its off-hook condition for completing a circuit that bridges said blocking means across said conductors in parallel with said paystation telephone apparatus to provide a shunt across the dial impulse spring means and the hook switch of said telephone apparatus, said blocking means upon being bridged across said conductors being effective to prevent dialing pulses from being transmitted to said central office, and means rendered effective by the deposit of a predetermined amount of money in coin at the paystation for interrupting the circuit that bridges said blocking means across said conductors to enable dialing pulses to be transmitted to said central office.

2. The telephone paystation adapter defined in claim 1 wherein said blocking means comprises electrical resistance means having a pre-selected value that enables conversation to take place via said talking pair of conductors while preventing the transmittal of dialing pulses over said talking pair of conductors.

3. The telephone paystation adapter defined in claim 1 comprising means for removing said blocking means from bridging relation across said conductors when said telephone apparatus is in its on-hook condition.

4. The telephone paystation adapter defined in claim 1 comprising means responsive to a predetermined condition that is established when a dialed party answers a call placed at said paystation for completing a circuit that re-bridges said blocking means across said conductors in parallel with said paystation telephone apparatus to re-establish said shunt.

5. An adapter for converting a postpay type telephone paystation into a type of paystation that requires prepayment before dialing pulses can be transmitted to a central office, said adapter comprising:

a. a pair of terminals adapted to respectively be connected through a telephone talking pair of conductors to a hook switch in the telephone in said paystation;

b. a normally disconnected dial pulse blocking means; and c. means responsive to a current flow that is caused by closure to said hook switch for completing a circuit that bridges said dial pulse blocking means across said terminals and thus across said talking pair of conductors in parallel circuit relation with said telephone to block the transmission of dial pulses from said telephone.

6. The adapter defined in claim 5 wherein said dial pulse blocking means is a resistor having a preselected value that enables conversation to take place via said talking pair of conductors while blocking the transmittal of dialing pulses over said talking pair of conductors.

7. The adapter defined in claim 5 comprising means responsive to the deposit of a predetermined amount of money in coin in said paystation for interrupting that circuit which causes said pulse blocking means to bridge across said talking pair, so as to enable dial pulses to be transmitted from said telephone to the central office.

8. An adapter for converting a post-pay type telephone paystation into a type of paystation that requires prepayment before dialing pulses can be transmitted to a central office, said adapter comprising: a pair of terminals adapted to respectively be connected through a telephone talking pair of conductors to a hook switch in the telephone in said paystation; a normally disconnected dial pulse blocking means; means responsive to a current flow that is caused by closure of said hook switch for completing a circuit that bridges said dial pulse blocking means across said terminals and thus across said talking pair of conductors to block the transmission of dial pulses from said telephone, means responsive to the deposit of a predetermined amount of money in coin in said paystation for interrupting that circuit which causes said pulse blocking means to bridge across said talking pair, so as to enable dial pulses to be transmitted from said telephone to the central office, a bistable storage device having a coin refund state and a coin collect state, said bi-stable storage device being in its refund state prior to the answering of a call by a dialed party, means rendered effective upon the occurrence of reverse talking battery polarity for switching said bi-stable storage device to its coin collect state, means rendered effective upon the opening of said hook switch for collecting deposited coins only when said bi-stable storage device is in its coin collect state, and means under the control of said bi-stable storage device for refunding the deposited coins upon opening said hook switch if said bi-stable storage device is in its refund state upon the return of said telephone to its on-hook condition.

9. A telephone paystation adapter for modifying a postpay type paystation telephone apparatus to require prepayment before dialing pulses can be transmitted to a central office, wherein said paystation telephone apparatus has a talking pair of signal transmitting conductors that are adapted to be connected to a central office, said adapter comprising dialing pulse blocking means, means rendered effective by the transfer of said paystation telephone apparatus from its on-hook condition to its off-hook condition for completing a circuit that bridges said blocking means across said conductors, said blocking means upon being bridged across said conductors being effective to prevent dialing pulses from being transmitted to said central office, means rendered effective by the deposit of a predetermined amount of money in coin at the paystation for interrupting the circuit that bridges said blocking means across said conductors to enable dialing pulses to be transmitted to said central office, and means responsive to a predetermined condition that is established when a dialed party answers a call placed at the paystation for completing a circuit that re-bridges said blocking means across said conductors.

10. The telephone paystation adapter defined in claim 9 comprising means for providing a predetermined signal in response to the return of said telephone apparatus to its on-hook condition following the completion of a call to the dialed party, said means responsive to said predetermined condition comprising circuit means, and said circuit means being conditioned by said predetermined signal to interrupt the circuit that was completed by said predetermined condition-responsive means.

11. The telephone paystation adapter defined in claim 10 wherein said circuit means comprises bistable means, and wherein said predetermined signal is in the form of a pulse for switching said bistable means from one of its bistable states to the other of its bistable states.

12. The adapter defined in claim 8 wherein said means for completing the circuit that bridges said dial pulse blocking means across said talking pair comprises contact means in series with said dial pulse blocking means, and relay means operated by closure of said hook switch only when said storage device is in its refund state to close said contact means to complete the circuit that bridges said dial pulse blocking means across said talking pair.

13. The adapted defined in claim 8 comprising means effective upon the opening of said hook switch for resetting said storage device to its refund state if it is in its collect state when said telephone is returned to its on-hook condition.

14. An adapter as described in claim 7 wherein a tone receiver is connected across the talking pair and also to a means for refunding said coins, said refunding means being responsive to an electrical signal produced by said tone receiver in response to a plurality of predetermined tones from the central office for refunding deposited coins.

15. A telephone paystation adapter circuit adapted to be located at a postpay type paystation telephone apparatus for modifying said telephone apparatus to require prepayment before dialing pulses can be transmitted to a central office, wherein said paystation telephone apparatus has a talking pair of signal transmitting leads that are adapted to be connected to a central office, said adapter circuit comprising dialing pulse blocking means, means rendered effective upon the transfer of said paystation telephone apparatus from its on-hook condition to its off-hook condition for completing a circuit that bridges said blocking means across said leads, said blocking means upon being bridged across said leads being effective to prevent dialing pulses from being transmitted to said central office, means rendered effective upon the deposit of a predetermined amount of money in coin at the paystation for interrupting the circuit that bridges said blocking means across said leads to enable dialing pulses to be transmitted to said central office, means for detecting a predetermined condition that is established when a dialed party answers a call placed at said paystation, means rendered effective by said detecting means upon detection of said predetermined condition for completing a circuit that re-bridges said dial pulse blocking means across said leads, and means rendered effective upon the return of said telephone apparatus to its on-hook condition for removing said dial pulse blocking means from bridging relation across said leads if said dial pulse blocking means is bridged across said leads at the time when said telephone apparatus is returned to its on-hook condition.

16. A telephone paystation adapter circuit adapted to be located at a postpay type paystation telephone apparatus for modifying said telephone apparatus to require prepayment before dialing pulses can be transmitted to a central office, wherein say paystation telephone apparatus has a talking pair of signal transmitting leads that are adapted to be connected to a central office, said adapter circuit comprising dialing pulse blocking means, means rendered effective upon the transfer of said paystation telephone apparatus from its on-hook condition to its off-hook condition for completing a circuit that bridges said blocking means across said leads, said blocking means upon being bridged across said leads being effective to prevent dialing pulses from being transmitted to said central office, means rendered effective upon the deposit of a predetermined amount of money in coin at the paystation for interrupting the circuit that bridges said blocking means across said conductors to enable dialing pulses to be transmitted to said central office, means for detecting a predetermined condition that is established when a dialed party answers a call placed at said paystation, means rendered effective by said detecting means upon detection of said predetermined condition for completing a circuit that re-bridges said dial pulse blocking means across said leads, and means rendered effective upon the return of said telephone apparatus to its on-hook state for (a) removing said dial pulse blocking means from bridging relation across said leads if said dial pulse blocking means is bridged across said leads at the time when said telephone apparatus is returned to its on-hook state, (b) collecting the deposited coins in the event that said predetermined condition is detected by said detecting means and (c) refunding the deposited coins in the event that said predetermined condition is not detected by said detecting means.

* * * * *

UNITED STATES PATENT OFFICE
CERTIFICATE OF CORRECTION

Patent No. 3,737,576 Dated February 18, 1970

Inventor(s) Lucian W. Spencer

It is certified that error appears in the above-identified patent and that said Letters Patent are hereby corrected as shown below:

Column 4, line 48, change "of" to --or--.

Column 4, line 51, change "transistor" to --transistors--.

Column 4, line 52, change "collectr" to --collector--.

Column 12, line 49 (claim 16, line 5), change "say" to --said--

Signed and sealed this 20th day of November 1973.

(SEAL)
Attest:

EDWARD M.FLETCHER,JR.
Attesting Officer

RENE D. TEGTMEYER
Acting Commissioner of Patents